June 14, 1966   E. L. SMITH   3,255,829
EARTH TILLING DEVICE
Filed June 12, 1964   3 Sheets-Sheet 1

ELMER L. SMITH
INVENTOR.

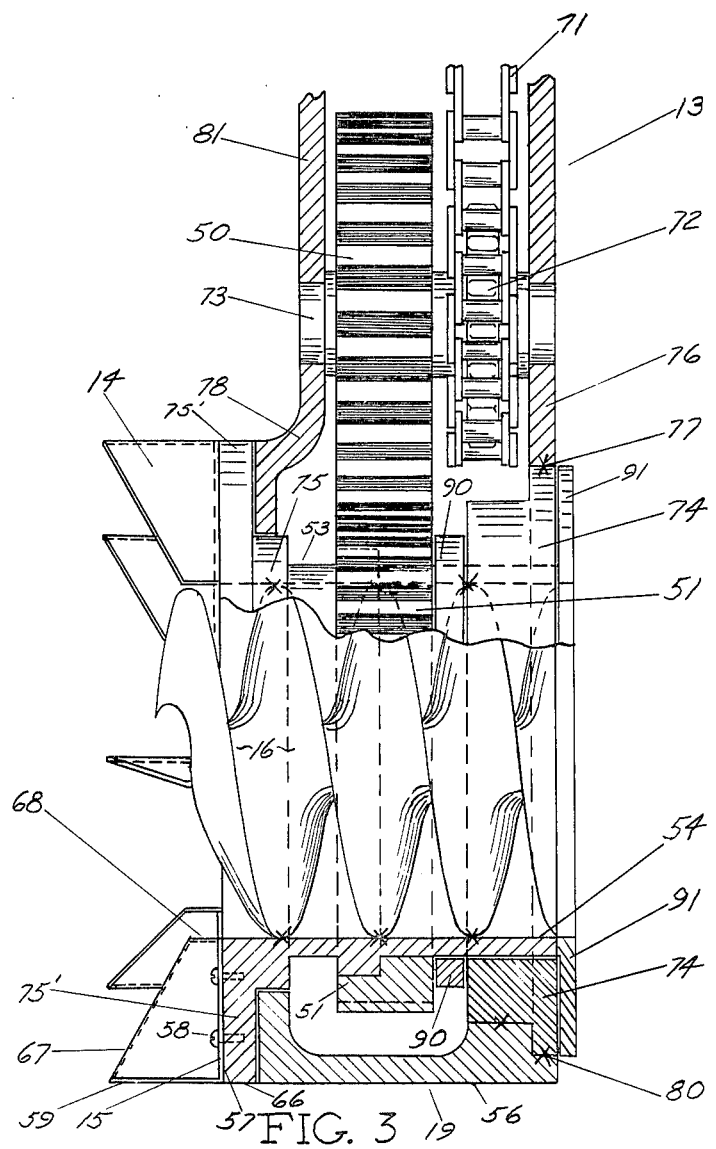
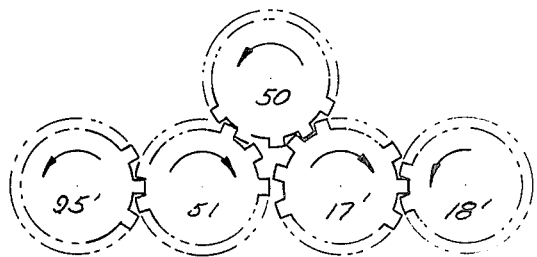
FIG. 4
ELMER L. SMITH
INVENTOR.

June 14, 1966  E. L. SMITH  3,255,829
EARTH TILLING DEVICE
Filed June 12, 1964  3 Sheets-Sheet 3

ELMER L. SMITH
INVENTOR.

BY 3,255,829
EARTH TILLING DEVICE
Elmer L. Smith, 412 Waverly Road, Eastlake, Ohio
Filed June 12, 1964, Ser. No. 374,583
4 Claims. (Cl. 172—108)

My invention relates to a rotary cutter preferably operating as an attachment in conjunction with a tractor or the like. The improved cutter of my invention, while herein illustrated as a cultivating tool, may also be used for breaking up of pavements and material other than soil.

It is an object of this invention to produce a simple and effective cutter which not only fulfills the purpose of a plow by loosening the earth but also pulverizes it, thus concurrently performing the functions of a disc and a harrow.

Another object of this invention is to provide a connection between a tractor and cutter attachment which permits the cutter unit to be raised in a semicircular path away from the work surface and the tractor to permit transportation of the unit in a nonengaged position.

A further object of the invention is to provide a cutter unit with means which positively feed the broken material internally through which further pulverizes the material, and which by pulling at the material provides forward traction for the cutter heads.

Another object of the invention is to provide a novel combination of coacting sets of cutter blades of such configuration as to produce greatly improved plowing and pulverizing action.

In the drawings:

FIGURE 3 is an enlarged cross-sectional side elevational view taken on a line 3—3 of FIGURE 2;

FIGURE 4 is a diagrammatic view similar to that of FIGURE 2 but showing the gear arrangement for driving the cutter blades;

Similar reference characters indicate corresponding parts throughout the several views in the drawings.

Figure 1:
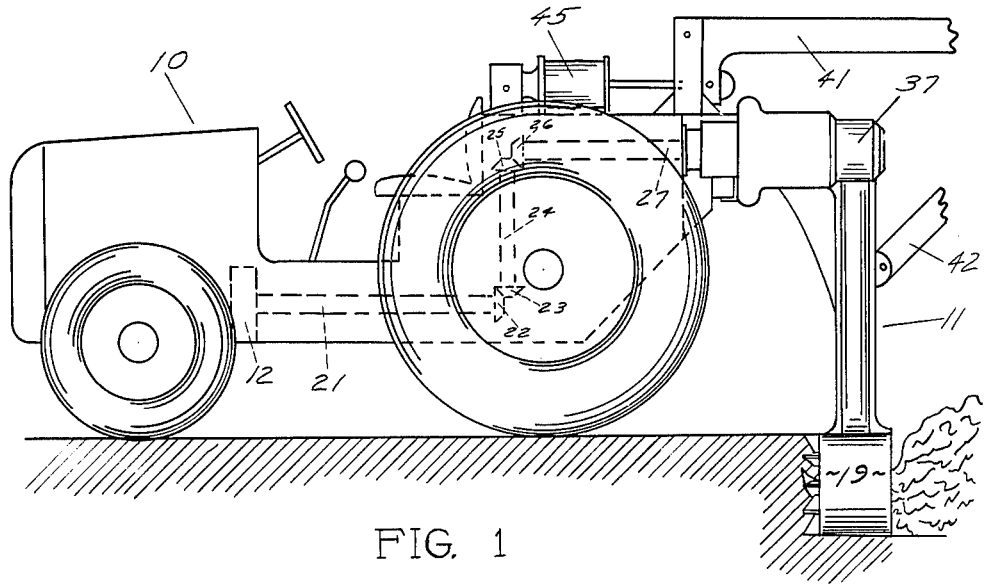
FIGURE 1 is a diagrammatic view in elevation showing the cutter unit as applied to a tractor in operative position.
Figure 5:
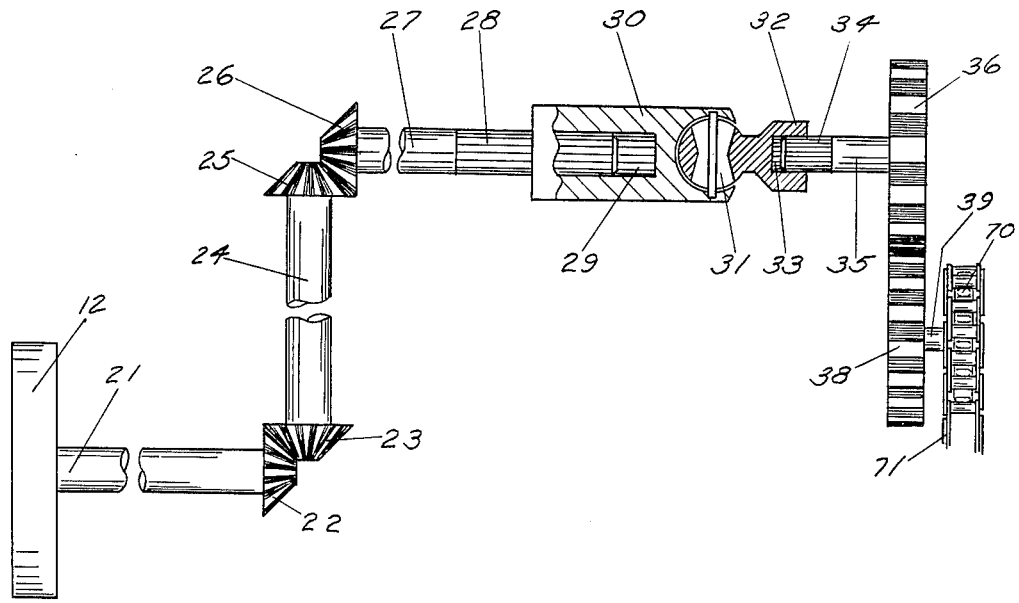
FIGURE 5 is a view showing the driving arrangement for interconnecting the power takeoff from the engine of a tractor to the swingable power transmission arm, including a universal type of coupling.

Referring now to the drawings, and in particular to FIGURES 1 and 5, I show the plow attachment of my invention as it would be used in conjunction with a tractor 10. Power takeoff and clutch means 12 driven by the tractor's engine (not shown) are employed to drive a horizontal drive shaft 21 which in turn drives a vertical drive shaft 24 through coacting bevel gears 22 and 23. A bevel gear 25 mounted on the upper extremity of the vertical drive shaft 24 meshes with bevel gear 26 thus imparting rotation to the shaft 27.

The opposite end of the upper horizontal drive shaft 27 is provided with external splining 28 which engage the internal splines 29 provided in an internal bore in the housing 30. The opposite end of the housing 30 is provided with a universal ball coupling 31, which permits the attachment to be raised or lowered in an arcuate path, regardless of whether or not rotation is being imparted to the cutting head assembly.

The opposite end of forked shaft 32 of the universal ball coupling 31 is provided with its socket 33 suitably splined to receive the splined end 34 of a drive shaft 35 upon which a spur gear 36 is mounted. The said gear 36 is contained within the upper portion 37 of plow attachment 11, and located at the outer or aft end of shaft 35.

Figure 6:
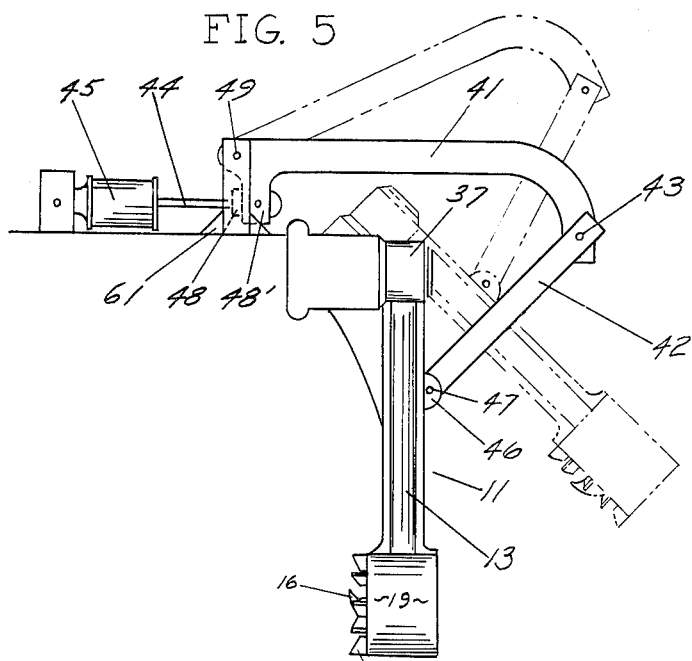
FIGURE 6 is a side elevational view of the boom means employed for elevating and lowering the cutter head unit in and out of operating position.

Referring now to FIGURES 1 and 6, the plow attachment 11 is raised and lowered by a boom 41 and connecting bar 42. Actuating power to achieve this is provided by a hydraulic cylinder 45 powered by a motor driven hydraulic motor and selective valves (not shown) in any well known manner. Fore and aft action of a ram bar 44, actuated by the hydraulic cylinder 45, is transmitted through a universal joint 48 to an arm 48' downwardly extending from the forward end of the boom 41 which functions as a bell crank, causing the aft end of the boom 41 to raise or lower vertically, the said boom being pivotally mounted at 49 on a vertical flange 61 affixed to an upper body member of the tractor 10.

The boom 41 is curved downwardly at its aft end and is provided with a vertically pivotal connection 43 to the connecting bar 42. The said connecting bar is provided at its lower end by a vertically pivoted connection 47 to a flange 46 which is welded or otherwise secured in an approximately medial position to the trailing edge of the central portion 13 of the plow attachment 11.

Referring now to FIGURES 3 and 5, the spur gear 36, contained within the upper portion 37 of the plow attachment 11, obtains its rotative movement from the power take-off and clutch 12, as already explained. The said spur gear 36 is meshed with spur gear 38 which is journalled on rotary axle 39, imparting rotation to sprocket 70 also journalled to the axle 39.

A chain drive 71 is employed to transmit rotation from the sprocket 70 to a sprocket 72 securely mounted on a rotatable axle 73 transmitting the rotary motion imparted thereto to a main cutter drive spur gear 50. As illustrated in FIGURES 3 and 4, the drive spur gear 50 directly engages a pair of cutter spur gears 51 and 17' mounted beneath and at either side of said gear 50 rotating said gears in an opposite rotary direction. A pair of cutter carrying spur gears 95' and 18' are disposed in alignment with and outwardly of the cutter gears 51, 17' respectively and are driven by the said spur gears 51, 17' but in a direction counter-rotative to the rotation of gears 51, 17'.

Figure 2:
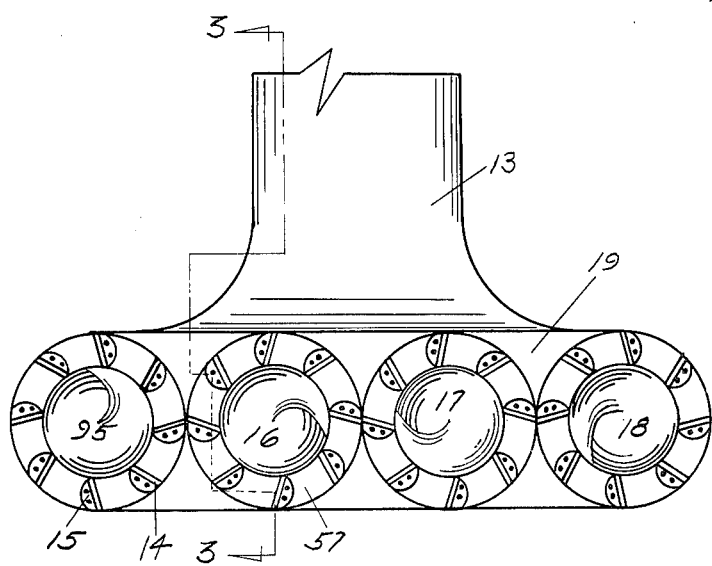
FIGURE 2 is an enlarged front view of the cutter portion of the implement showing the leading edges of the cutter and pulverizing blades.

The attachment 11 comprises, as shown in FIG. 6, the upper cylindrical portion 37, the tubular arm 13 vertically disposed in normal working position and displaceable to a road transport position, the arm 13 having a lowermost open ended cutter housing portion 19 integrally formed therewith and disposed longitudinally and at right angles thereto, as best shown in FIGURE 2.

The rear wall 76 of the housing portion 19, as best shown in FIGURE 3, of the arm 13 is apertured to accommodate a rear steel bearing 74 which is welded to the wall as shown at 77 and at 80. A bronze thrust washer 90 is preferably located between the steel bearing 74 and spur gear 51. The housing portion 19 is further provided with an opening in its forward wall to accommodate a rotatable cylinder 53. The cylinder 53 is provided with forwardly and rearwardly disposed peripheral flanges 75, 75' and the cylinder 53 provides support for a rotative blade assembly carried thereby and also centrally locates the spur gear 51 carried thereby.

The outer peripheral flange 75' is of such depth that its edge surface 66 lies on a plane with the lowermost surface 56 of the portion 19 of the housing 13. A plurality of circumferentially spaced cutting blades 14 are secured to the forward face 57 of the flange 75' and are detachably affixed thereto, for purposes of repair or replacement, by bolts 58. The rearward flange 91 maintains the cylinder 53 against endwise movements.

The cutting blades 14 are illustrated of trapezoidal form and are each provided with a right angle integral flange 15 at the base of the blades apertured to accommodate the bolts 58. The flanges 15 are adapted to lie flush with the forward face 57 of the flange 75' and are illustrated as lying at an angle to the axes of the cylinders. The base 59 of each of the cutter blades 14 is mounted as to be on a plane with the peripheral edge surface 66 of the member 75.

The nonparallel leading edges 67 of the trapezoidal cutting blades 14 shown are angled from the outer most portion of their base portion 59 rearwardly to a relatively shorter inner most face 68 of the blades 14 which lies parallel to the outermost cutting surface of the base 59. The said innermost surfaces 68 of the blades 14 lies on a plane with the inner wall surfaces 54 of the cylindrical member 53.

A helical cutter 16 is secured as by welding to the wall surfaces of each of the cylinder members 53 and extends longitudinally therethrough. Each outer screw is provided with approximately one-half turn in advance of each cylinder to facilitate feeding of material through said cylinder. Said forward portion of the cutter is disposed preferably rearwardly of the outermost edge 67 of the blade.

In operation, the clutch mechanism incorporated in the power takeoff 12 is engaged while the cutter unit is in the dotted line road-transport position shown in FIGURE 6 and is slowly brought into engagement with the surface to be worked until sufficient material is ingested to permit the unit to assume the normal working position shown in the solid line, through the use of the power transmission mechanism and the raising and lowering of the arm 13 and boom structure previously. As the plow attachment 11 engages the surface to be worked, the primary cutter blades 14 disposed with their cylinder housings below the surface of the earth, etc, to be worked, break up the said surface into fragments. During the advance of the vehicle, the inwardly tapered surfaces 67 of the blades 14 on each cylinder 53 act during rotation thereof not only as cutters but as a conical feed urging the material cut thereby into the opening in the cylinder 53, the helical cutter 16 acting thereon to further cut and pulverize the material passing through the cylinder and outwardly through the opening in the rear wall of the portion 19 of the housing 13. It will be noted that as shown in FIGURES 2 and 5 reverse threading is used on helical cutters of the outer cutting assemblies 95 and 18 so that the pulverized material is uniformly urged in a rearward direction. This ejection of the material together with the forward screw action provided by the turns of the screw or helix creates a combined force to help maintain the plow in its operating position and facilitates the earth etc. cutters operation, lessening power requirements, as well.

What I claim is:

1. A rotary cutter of the class described comprising in combination motor driven propelling means, a tubular arm having an open terminal end cutter housing portion, gear transmission means adapted to be driven by said propelling means disposed within said tubular arm and said housing, said housing containing a rotatable cylinder driven by said gear transmission means, said cylinder comprising a peripheral flange at opposite ends thereof, each peripheral flange extending outwardly of said housing from an opposite end thereof, a plurality of spaced blades secured to one of said flanges and radiating therefrom at a forward inclination to the axes of said cylinder, a helical cutter disposed longitudinally within said rotatable cylinder and rotated thereby, a portion of said helical cutter being disposed forwardly of the cylinder and rearwardly of the extreme edges of the cutter blades.

2. A rotary cutter of the class described comprising in combination motor driven propelling means, a tubular arm having an open terminal end cutter housing portion, gear transmission means adapted to be driven by said propelling means disposed within said tubular arm and said housing, said housing containing a rotatable cylinder driven by said gear transmission means, said cylinder comprising an outwardly extending peripheral flange at opposite ends thereof, a plurality of spaced blades secured to one of said flanges and radiating therefrom at a forward inclination to the axis of said cylinder, a helical cutter disposed longitudinally within said rotatable cylinder and rotated thereby, a portion of said helical cutter being disposed forwardly of the cylinder and rearwardly of the extreme edges of the cutter blades, said rearward flange maintaining the cylinder against endwise movement.

3. A rotary cutter of the class described comprising in combination motor driven propelling means, a tubular arm having an open terminal end cutter housing portion, gear transmission means adapted to be driven by said propelling means disposed within said tubular arm and said housing, said housing containing a rotatable cylinder driven by said gear transmission means, said cylinder comprising an outwardly extending peripheral flange at opposite ends thereof, a plurality of spaced blades secured to one of said flanges and radiating therefrom at a forward inclination to the axis of said cylinder, a helical cutter disposed longitudinally within said rotatable cylinder and rotated thereby, a portion of said helical cutter being disposed forwardly of the cylinder and rearwardly of the extreme edges of the cutter blades, said blades being disposed at an angle to the radial line of the helical cutter.

4. A cutter adapted to be connected to and operated by a tractor and comprising an attachment adapted to be pivotally connected to the rear of said tractor, said tractor having a driving shaft, a power takeoff shaft adapted to be secured to said attachment and driven by said drive shaft, a boom secured to said tractor and adapted to raise and lower said attachment, a housing for said attachment, gear transmission means disposed within the housing propelled by said power takeoff, a main cutter drive gear driven by said gear transmission means, a rotatable cylinder driven by said gear transmission means disposed within the said housing, a cutter blade assembly comprising a gear meshing with said main cutter drive gear, said cutter gear fixed around said rotatable cylinder and rotated therewith, said cylinder having an outwardly extending peripheral flange at opposite ends thereof, one of said flanges carry a plurality of spaced blades forwardly thereof and having a helical cutter fixed longitudinally within said cylinder and rotatable therewith, the cutter blades adapted to cut soil and to feed soil cut thereby into the helical cutter during movement of the tractor, said cutter blades being disposed beneath the surface of the soil and the soil being ejected rearwardly from the cylinder.

References Cited by the Examiner

UNITED STATES PATENTS

| | | | |
|---|---|---|---|
| 24,043 | 5/1859 | Montgomery | 37—81 |
| 700,247 | 5/1902 | Scott | 172—532 |
| 1,619,797 | 3/1927 | Martikainen | 172—58 XR |
| 1,701,678 | 3/1929 | Jaeger | 172—33 XR |
| 2,615,263 | 10/1952 | Barras | 37—92 |
| 2,658,436 | 11/1953 | Gatti | 172—108 XR |
| 2,705,379 | 5/1955 | Fruhling | 37—81 |
| 2,859,014 | 11/1958 | Berner | 172—108 XR |
| 3,102,349 | 9/1963 | Thompson | 172—108 XR |

FOREIGN PATENTS

| | | |
|---|---|---|
| 938,685 | 2/1956 | Germany. |
| 2,405 | 2/1894 | Great Britain. |

ABRAHAM G. STONE, *Primary Examiner.*

T. GRAHAM CRAVER, *Examiner.*

F. B. HENRY, *Assistant Examiner.*